Aug. 18, 1964 D. D. WILLARD 3,145,373

TAPE DRIVE AND INDEXING SYSTEM

Filed Oct. 12, 1962 2 Sheets-Sheet 1

DENNIS D. WILLARD
INVENTOR.

BY Robert H. Clay

ATTORNEY

TAPE DRIVE AND INDEXING SYSTEM

Filed Oct. 12, 1962 2 Sheets-Sheet 2

DENNIS D. WILLARD
INVENTOR.

BY Robert D. Clay

ATTORNEY

United States Patent Office 3,145,373

Patented Aug. 18, 1964

3,145,373

TAPE DRIVE AND INDEXING SYSTEM

Dennis D. Willard, Los Angeles, Calif., assignor to Ampex Corporation, Redwood City, Calif., a corporation of California Filed Oct. 12, 1962, Ser. No. 230,073
4 Claims. (Cl. 340—174.1)

This invention relates to tape drive systems and, in particular, to an incremental drive system for selectively advancing a recording tape medium in long or relatively short increments at different advancing rates.

Recording and reproducing systems have been developed in the past that include various tape drive or advancing means. Devices incorporating the previously developed drive means have proven suitable for use for many applications. However, the need exists for a versatile drive system that can be suitably adapted for use with a recording-reproducing apparatus utilized in conjunction with a digital computer or the like. Such an application generally requires that information be recorded on or reproduced from selected portions of a tape medium that is advanced at different speeds during periods of travel. More particularly, the need exists for a system wherein information can be read from or recorded on a selected portion of a magnetic tape medium at one speed and for a selected period of travel, while being capable of advancing the tape at a second speed between the intervals when such reproducing-recording operations are taking place.

Another feature that is desirable is a recording-reproducing system utilized in conjunction with a computer is the provision of means for responding to a signal so that the necessary tape advancing rate can be achieved and maintained for the duration of the desired recording or reproducing operation and returned to a second advancing rate subsequent to the completion of the operation.

Accordingly, it is an object of the present invention to provide a new and improved low cost incremental tape drive system for use in conjunction with a digital computer or the like.

Another object of the present invention is to provide a tape drive system that can selectively vary the incremental advancing rate of a tape medium. A further object of the present invention is to provide an incremental tape drive system for selectively advancing a tape having information recorded thereon, and that can sense the presence of errors in the format of the information recorded on the tape.

A further object of the present invention is to provide an incremental tape drive system that can be utilized to advance a tape medium over a selectively variable increment at a first speed in response to a signal, and at a second speed in response to another signal.

Other objects and advantages of the present invention will become apparent from the following detailed description when considered in conjunction with the accompanying drawings wherein.

A preferred embodiment of the incremental drive system includes a two speed drive or tape advancing means that can be utilized to selectively advance at different speeds a tape medium having information of a complementary nature stored thereon over selectively variable increments. In addition, the system includes a control circuit responsive to signal information stored on the tape for initiating the advance of the tape by the drive means at a desired speed and over the desired incremental distance. One embodiment of the system preferably includes means for detecting errors in the complementary recording on the tape during the advance thereof so that suitable correcting action or compensation can be effected by circuit components associated with a computer apparatus, in conjunction with which the tape drive system is utilized. Although the embodiment of the drive system generally described above, and hereinafter described in detail, can be utilized in a number of applications with suitable modifications in various features thereof, the description will be directed primarily to the drive system in one particular application. As described, the drive system is utilized to effect the incremental advance of a tape having binary information recorded thereon during the intervals when the information is being read therefrom.

Figure 1:
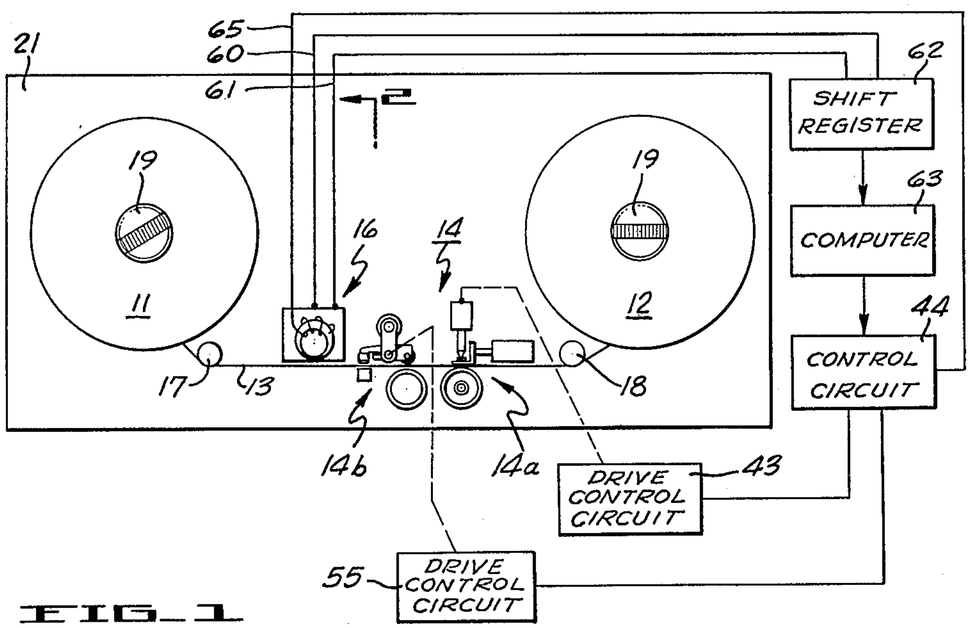
FIGURE 1 is a schematic diagram, partly in block form, of a recording-reproducing system including a two speed incremental drive system embodying various features of the present invention.
Figure 2:
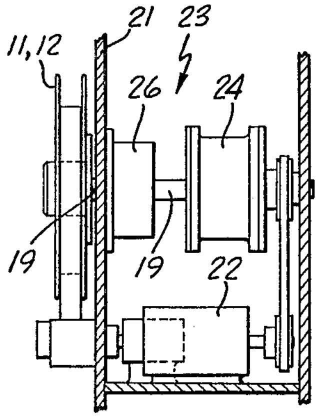
FIGURE 2 is a cross-sectional view of the inventive system taken along the line 2—2 in FIGURE 1.

As shown in FIGURES 1 and 2, a recording-reproducing system 10 incorporating one preferred embodiment of an incremental drive system includes a pair of tape reels 11 and 12, that are utilized to store a tape medium 13 such as a magnetic tape. The tape reels 11 and 12 also serve to supply and takeup the tape 13 that is advanced by a two speed incremental drive unit 14 relative to a conventional read-write head assembly 16. The head assembly includes three heads which are disposed in an aligned relationship transversely of the path of travel of tape 13. A pair of guide rollers 17 and 18 are utilized to guide the tape relative to the head assembly 16.

It should be understood that the features of the recording-reproducing device 10 described above are merely illustrative of the major components which would be incorporated in any embodiment of such a device incorporating the incremental tape drive system. Manifestly, various other conventional components are utilized in commercial embodiments of recorder-reproducers and do not form a part of the present invention. Therefore, these other more detailed features of a conventional recorder-reproducer will not be described.

In FIGURE 2, each of the tape reels 11 and 12 is mounted on a spindle 19 for rotary motion therewith. The spindles 19 extend through a playing deck or support table 21. Each reel is connected by the spindle 19 associated therewith to a conventional drive mechanism such that the desired tension is maintained on the tape 13 at all times and selective winding and rewinding of the tape can be readily effected. The drive mechanism includes a continuously running motor 22 that is connected indirectly through a conventional belt-pulley arrangement 23 to the spindles 19. The motor 22 acting through the belt-pulley arrangement 23, drives a pair of conventional selectively engageable dog clutches 24, one each of which is associated with the reels 11 and 12 and linked to the tape spindles 19 through a conventional fluid or liquid clutch generally designated by the numeral 26.

The connection between the dog clutch 24 and liquid clutch 26 for each spindle 19 is such that when the dog clutch is not engaged, there is a drag created on the associated tape spindle 19 by the liquid clutch that is proportional to the angular velocity of the tape reel. On the other hand, when the dog clutch is engaged and being driven, the torque from the motor 22 is transmitted through the fluid clutch 26 to the tape reel spindle 19.

When both dog clutches 24 are engaged, the tape reel spindles 19 associated with each of the tape reels 11 and 12 are urged to rotate in opposite directions through the fluid clutches 26 so that a net force is applied to the tape 13 that is sufficiently large to maintain the desired tension thereon. When the incremental drive unit 14 is rendered effective as hereinafter described, the force imparted to the tape 13 by the drive unit overcomes the net zero force imparted to the tape by the counteracting reels 11 and 12. Accordingly, the reel serving as the takeup reel receives the tape while the reel acting as the supply reel supplies the tape at the necessary rate under the influence of the drive 14.

If, however, it should be desired to advance the tape independent of the drive unit 14 (e.g. the fast rewind of the tape), the dog clutch 24 associated with the takeup reel is engaged while the dog clutch 24 associated with the supply reel is disengaged. With the appropriate dog clutches engaged and disengaged, the fast rewinding of the tape 13 is effected. The fluid clutch 26 associated with the supply reel functions as a dynamic brake that effectively precludes an overshoot of the unwinding tape 13, while at the same time providing the necessary tension on the tape to yield the proper wrap on the takeup reel. A fast advance can be effected in a similar manner.

Figure 3:
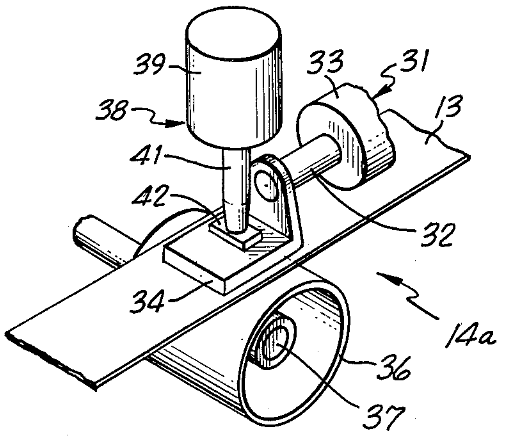
FIGURE 3 is a simplified exploded view of one embodiment of a portion of the two speed incremental drive unit of the present invention.
Figure 4:
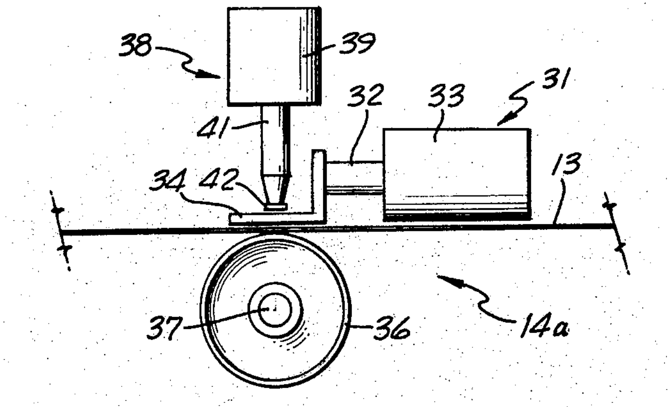
FIGURE 4 is a cross-sectional view illustrating the unit depicted in FIGURE 3 in greater detail.
Figure 5:
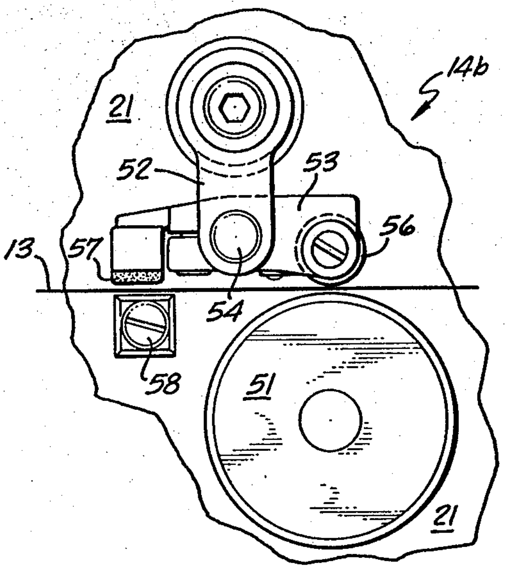
FIGURE 5 is an enlarged fragmentary view of another portion of the two speed incremental drive of the present invention.

FIGURES 3–5 illustrate the more detailed features of one preferred embodiment of the two speed incremental drive unit 14. More particularly, FIGURES 3 and 4 show a preferred embodiment of one of the drives included in the drive unit 14 which effects the bit by bit advancement of the tape 13 at a relatively high speed. This first drive unit 14*a* relies on the principal that a magnetostrictive element can be made to oscillate at fairly long distances if the oscillation is continuous. Accordingly, a continuously oscillating first magnetostrictive member is employed which is selectively advanced into contact with the tape by a selectively actuated second magnetostrictive member to effect the incremental advancement thereof on a bit by bit basis relative to the head assembly 16.

The first drive unit 14*a* comprises a first oscillatory magnetostrictive member 31 including a rod 32 formed of a material such as nickel, permalloy, or any other material having magnetostrictive characteristics, which extends outwardly from a housing 33. The housing 33 serves as a confining enclosure for a magnetic field producing means of a conventional type that is energized to effect magnetostriction in the rod 32.

An L shaped plate 34 is secured to the outer extremity of the rod 32 so as to be disposed tangentially above a freely rotatable roller member 36. More particularly, the plate 34 lies above the path of travel of the tape 13, and is positioned in alignment with a portion of a peripheral surface of the roller member 36. The roller member 36 is secured in fixed relation to a shaft 37 that extends through the playing deck 21 and is mounted within a bearing assembly (not shown).

A second oscillatory magnetostrictive member 38 is mounted on the playing deck 21 in substantially perpendicular relation to the first oscillatory member 31. The oscillatory member 31 and 38 are generally similar in that the oscillatory member 38 also includes a housing 39 and a rod 41 formed of nickel, permalloy, or any other material having magnetostrictive characteristics. The housing 39 also includes a magnetic field producing means which is selectively energized to impart a magnetostriction to the element 41 and effect the vertical advance thereof relative to the plate 34. The lower extremity of the element 41 is secured to a rectangular plate element 42 which is aligned with the L shaped plate member 34 secured to the oscillating rod 32.

As shown in FIGURE 4, the plate 42 is normally positioned a small distance above the upper surface plate 34 so that continuous oscillation of the latter can be effected without being engaged by the plate 42. A drive control circuit 43 imparts necessary signal pulses to the magnetic field producing means disposed within the housings 33 and 39 so that desired oscillatory motion is imparted to the rods 32 and 41 to effect the advancement of the tape 13. In this connection, a varying magnetic field is provided for the member 31 so that the rod 32 and associated plate 34 have oscillatory motion continuously imparted thereto. As a consequence, the plate 34 is advanced back and forth on an extremely rapid basis due to the expansion and contraction of the rod 32 under the influence of the varying magnetic field. Since the plate 34 is spaced slightly above the peripheral surface of the roller member 36 and the tape 13, the continuous oscillatory motion of the plate 34 normally does not result in motion being imparted to the tape 13. However, when the control circuit 43 supplies a pulse to the magnetic field producing means included within the housing 39 sequential expansion and contraction of the rod 41 are realized. As a consequence, the plate 42 is brought into engagement with the then oscillating plate 34 thereby bringing plate and tape into substantially instantaneous contact with the roller member 36 and the incremental advancement of the tape 13 is then effected.

The drive control circuit 43 effects this timed expansion and contraction of the vertically extending rod 41 in timed relation to the oscillation of the plate 34 so that accurate bit by bit advancement of the tape relative to the head assembly 16 is realized. The circuit 43 is selectively controlled by a master control circuit 44 so that the actuation of the first drive unit 14*a* coincides with that of the second drive unit 14*b*.

The second drive unit 14*b*, which is designed to effect the advancement of the tape on a character distance basis at a somewhat lower speed that the first drive unit 14*a*, may be any one of several conventional drives. However, one preferred drive unit, the major components of which are illustrated in FIGURE 5, is that disclosed and claimed in Patent Number 3, 002, 671 which issued to the assignee of the present invention on October 3, 1961. Although the structural details of and the advantages yielded by the drive are fully and adequately disclosed and claimed in this patent, the more significant components are hereinafter described to aid in an appreciation of the two speed incremental drive system of the present invention.

Referring to FIGURE 5, the second drive unit 14*b* generally includes a capstan 51 that is continuously driven at a selected speed by a conventional drive motor (not shown). The capstan 51 is mounted on the playing deck 21 for rotary motion relative thereto below the normal path of travel of tape 13 and adjacent the first drive unit 14*a*. A stationary support or mounting member 52 that is mounted on the playing deck 21 has a roller support arm 53 secured thereto by a shaft 54 so that the roller arm is free to pivot about the shaft and relative to the mounting member 52. The pivotal movement of the arm 53 results from the energization of an electromagnetic control means under the influence of a drive control circuit 55 that is supplied with control pulses from the master control circuit 44.

A tape engaging roller 56 is rotatably secured to one free end of the pivotal support arm 53 so that, upon actuation of the electromagnetic control means, clockwise pivotal movement of the arm 53 causes the roller 56 to bring the tape 13 into engagement with the periphery of the capstan 51, whereby the tape is moved over a selected distance and at a selected speed.

The other free end of the pivotal support arm 53, which is oppositely disposed to that whereto the roller 56 is rotatably secured, has a brake shoe element 57 attached thereto in alignment with a fixed snubbing stub 58. The stub 58 is secured to the plane deck or support table 21 beneath the path of travel of the tape. The function of the brake shoe 57 and stub 58 is to impart a stopping force to the tape after the roller 56 has been pivoted out of driving engagement with the capstan 51 subsequent to the desired movement of the tape over a selected character distance. When the electromagnetic control means 39 is de-energized, the arm 53 pivots to a normal position and the brake shoe 57 instantaneously brings the tape 13 into engagement with the stub 58 thereby minimizing the tendency of the tape to overshoot.

The use of complementary recording on a magnetic tape is particularly suitable for use in the aforedescribed recorder-reproducer incorporating the incremental drive sytem of the present invention. However, in complementary recording of binary information (i.e. the simultaneous recording of two tracks on a magnetic tape with the complement of one track appearing on the other track), any given character including a selected number of bits requires that one and only one bit to be present at each bit location of the character.

Figure 6:
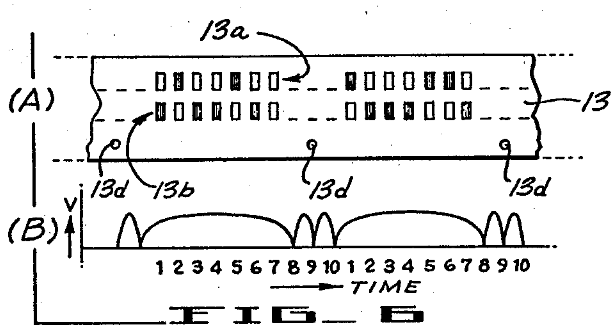
FIGURE 6A is a view illustrating a segment of magnetic tape having information of a complementary nature recorded thereon.
FIGURE 6B is a plot of tape velocity versus time, which corresponds to that which would be realized when the segment of tape illustrated in FIGURE 6A is advanced by the incremental drive of the present invention.

With reference to FIGURE 6A, one track 13*a* of a complementary recording is conventionally designated the "zero" track while the second track 13*b* is designated the "one" track. This character information is read out by the reproducing device 10, and, the information is selectively fed from the head assembly 16 by way of signal carrying conductors 60 and 61 through a conventional shift register 62 to a computer 63. Conventional circuit means provided in the computer input monitors the tape information, and detects both single and double errors.

For example, if a bit inadvertently appears both in the "one" and "zero" tracks at the first bit position of the character purportedly representing the character 101101, the circuit means associated with the computer input both detects and signals the presence of the error and notes the position thereof. Similarly, if the desired bit in the "one" track of the first bit position was missing, the absence of a bit in both the "zero" and "one" tracks is likewise detected and the position thereof noted. Accordingly, the error detecting circuit means detects single errors of this type on a bit by bit basis.

If, in the illustrated character, an unwanted bit was present in the "zero" track while the wanted bit was missing from the "one" track in the first bit position, the bit by bit monitoring would not detect this double error. To overcome this difficulty, the character information recorded on the tape and read therefrom through the recorder-reproducer 10 incorporating the incremental drive system of the present invention includes an additional bit position wherein a so-called redundancy bit is incorporated.

In this connection, the character information is recorded so that an odd number of bits is included in the "zero" track of each and every character, while an even number of bits is recorded in the "one" track of each character. This is accomplished by suitably including the redundancy bit in either the "zero" or "one" track of the character in accordance with the number of "zeros" and "ones" in the character proper. In conjunction with the utilization of an additional bit position in each character, circuitry is also provided in the input circuit of the computer 63 so that double errors are detected by suitably monitoring the "zero" track odd bit parity and the "one" track even bit parity.

In order to control the incremental advancement of the tape 13 having binary information of a complementary nature recorded thereon relative to the head assembly 16, the tape is provided with a plurality of so-called sprocket marks 13*d*. As illustrated in FIGURE 6A, the sprocket marks are located on the tape 13 adjacent the "one" track 13*b* and in spaced relation to the first bit position of each character in the direction of tape travel. These sprocket marks 13*d* serve to indicate the beginning of character information.

In this connection, a third of the heads included in the head assembly 16 senses the presence of the sprocket marks 13*d* and provides a signal via a signal carrying conductor 65 to the master control circuit 44. When the signal is received by the master control circuit 44, the necessary pulses to the control circuit 43 of the first drive unit 14*a* are cut off and this drive is consequently precluded from effecting the bit by bit advancement of the tape. Simultaneously, the master control circuit 44 supplies a start pulse to the control circuit 55 of the second drive unit 14*b* to energize the electromagnetic control means thereby causing the tape to be advanced the desired character distance and at the desired advancing rate.

The operation of the entire system will be best understood when considered in conjunction with the plot of tape velocity versus time, which is illustrated in FIGURE 6B. The normal advance of the tape is effected by the first drive unit 14*a* on a bit by bit basis. Accordingly, on a control signal from the computer 63 applied to the master control circuit 44, the reproducer 10 is rendered effective to supply information through the shift register 62 to the computer 63.

The master control circuit 44 supplies the necessary signal pulses to the circuit 43 so that the periodic actuation of drive unit 14*a* is effected. As a consequence, the tape is advanced intermittently over a distance corresponding to approximately a single bit position at a relatively high speed. This bit by bit advance of the tape 13 continues until the presence of a sprocket mark 13*d* is sensed by the head assembly 16 at which time the first drive unit is rendered ineffective. At the same time, the electromagnetic control means that controls the pivoting of the tape engaging roller 56 of the second drive unit 14*b* is rendered effective by a signal from the master control circuit 44. As a consequence, the tape is brought into engagement with the capstan 51 and advanced a predetermined character distance at a second advancing rate that is substantially slower than the bit by bit advancing rate effected by the first drive unit 14*a*. After the tape 13 has been advanced the predetermined character distance by the tape drive unit 14*b* is dictated by the master control circuit 44, the drive unit 14*b* is rendered ineffective and the bit by bit advancement of the tape is again initiated.

The use of the two speed incremental drive 14 results in slight variations in the advancing rate of the tape even during periods when the reproduction of information stored thereon is being effected and fed to the computer 63. To compensate for these variations, a "self-clocking" feature is incorporated in the system thereby eliminating any errors introduced as a result of variations in the advancing rate of the tape. In this connection, a continuous clock pulse generator associated with the recording head assembly is synchronized by the flux changes in the recorded binary information on the tape 13 so that the clocking pulses have the same time variations as the recorded information. This feature of the system is such that the information is derived from the tape at a substantially constant rate during the playback mode.

During the interval when information is derived from the tape 13, the error detecting circuitry in the input of the computer 63 monitors the information for the presence of both single and double errors as previously described. Should an error be sensed in the tape format, suitable instrumentalities (not shown) are rendered effective to apprise an operator of an error in the character format.

In one specific embodiment of a two speed incremental drive system embodying various features of the present invention, the first tape drive unit 14*a* is selected so that the tape 13 is advanced thereby at a repetition rate approaching approximately 50,000 bits per second. With the tape format being selected so that each character contains seven or more bits, the rate at which the tape is advanced by the second drive unit 14b is selected to be approximately 5,000 bits per second. Due to the advancing rate differential between the tape drive units 14a and 14b, there is effectively no delay in the system during the periods when information is not being derived from the tape.

From the foregoing, it can be seen that the present invention provides a system whereby a two speed drive system, which can be readily designed to be no larger than a conventional home tape recorder, is utilized to satisfactorily supply information to or derive information from a digital computer.

What is claimed is:

1. A tape drive system for effecting the incremental advance of a tape medium along a predetermined path of travel and relative to a read-write head assembly of a recording-reproducing device, comprising:

a two speed incremental drive system including a first drive unit disposed along the path of travel of the tape for advancing the tape in incremental steps at a first advancing rate; and a second drive unit disposed along the path of travel of the tape adjacent to said first drive unit for advancing the tape in steps corresponding to the length of the character information recorded thereon at a second advancing rate;

first circuit means responsive to a first signal for actuating the first drive unit; and second circuit means responsive to signal information derived from the tape by the read-write head assembly of the recording-reproducing device for inactivating the first drive unit and for actuating said second drive unit to derive character information from the tape.

2. The combination of a computer having error detecting circuitry in the input circuit thereof, and a recording-reproducing device that includes a tape drive system for effecting the incremental advance of a tape medium along a predetermined path of travel and relative to a read-write head assembly of the recording-reproducing device, comprising:

a two speed incremental drive including a first drive unit disposed along the path of travel of the tape for advancing the tape in incremental steps at a first advancing rate; and a second drive unit disposed along the path of travel of the tape adjacent to said first drive unit for advancing the tape in steps corresponding to the length of the character information recorded thereon at a second advancing rate; first circuit means responsive to a first signal for actuating said first drive unit; and second circuit means responsive to signal information derived from the tape by the read-write head assembly of the recording-reproducing device for inactivating the first drive unit and for actuating said second drive unit to derive character information from the tape.

3. A tape drive system for effecting the incremental advance of a tape medium along a predetermined path of travel and relative to a read-write head assembly of a recording-reproducing device, comprising:

a first drive unit disposed along the path of travel of the tape for advancing the tape in incremental steps corresponding substantially to individual bit positions at a first advancing rate;

a second drive unit disposed along the path of travel of the tape adjacent to said first drive unit for advancing the tape in steps corresponding to the length of the character information recorded thereon at a second advancing rate;

first circuit means responsive to a first signal for actuating said first drive unit to effect the initiation of the bit by bit advance of the tape; and a second circuit means electrically connected to the head assembly of the recorder-reproducer and responsive to signal information derived for rendering the first drive unit ineffective and for rendering said second drive unit effective during which period character information is derived from the tape.

4. The combination of a computer having error detecting circuitry in the input circuit thereof, and a recording-reproducing device that includes a tape drive system for effecting the incremental advance of a tape medium along a predetermined path of travel and relative to a read-write head assembly of the recording-reproducing device, comprising:

a first drive unit disposed along the path of travel of the tape for advancing the tape in incremental steps corresponding substantially to individual bit positions at a first advancing rate;

a second drive unit disposed along the path of travel of the tape adjacent to said first drive unit for advancing the tape in steps corresponding to the length of the character information recorded thereon at a second advancing rate;

first circuit means responsive to a first signal for actuating said first drive unit to effect the initiation of the bit by bit advance of the tape; and second circuit means electrically connected to the head assembly of the recorder-reproducer and responsive to signal information derived for rendering the first drive unit ineffective and for rendering said second drive unit effective during which period character information is derived from the tape.

No references cited.